United States Patent
Kawamura (10) Patent No.: US 6,703,747 B2
(45) Date of Patent: Mar. 9, 2004

(54) GENERATOR WITH DIVERSE POWER-GENERATION CHARACTERISTICS

(76) Inventor: Hideo Kawamura, 13-5, Okada 8-chome, Samukawa-machi, Kouza-gun, Kanagawa-ken (JP), 253-0105

( * ) Notice: Subject to any disclaimer, the term of this patent is extended or adjusted under 35 U.S.C. 154(b) by 0 days.

(21) Appl. No.: 09/887,088

(22) Filed: Jun. 25, 2001

(65) Prior Publication Data

US 2002/0060505 A1 May 23, 2002

(30) Foreign Application Priority Data

Sep. 27, 2000 (JP) ........................................ 2000-293650

(51) Int. Cl.$^7$ ................................................ H02K 1/00
(52) U.S. Cl. ........................ 310/179; 310/184; 310/180; 310/198
(58) Field of Search ................................ 310/184, 198, 310/179, 181, 180, 254, 257, 258; 29/596–598

(56) References Cited

U.S. PATENT DOCUMENTS

| | | | |
|---|---|---|---|
| 4,403,401 A | * | 9/1983 | Rosenberry .................. 29/596 |
| 5,231,324 A | * | 7/1993 | Kawamura et al. .......... 310/198 |
| 5,929,611 A | * | 7/1999 | Scott et al. .................... 322/46 |
| 6,034,460 A | * | 3/2000 | Tajima et al. ................ 310/179 |
| 6,255,755 B1 | * | 7/2001 | Fei .............................. 310/184 |
| 6,268,675 B1 | * | 7/2001 | Amrhein ..................... 310/90.5 |
| 6,323,574 B1 | * | 11/2001 | Takura ........................ 310/179 |
| 6,340,857 B2 | * | 1/2002 | Nishiyama et al. ..... 310/156.53 |
| 6,407,476 B1 | * | 6/2002 | Nishimura .................. 310/180 |

FOREIGN PATENT DOCUMENTS

| | | |
|---|---|---|
| JP | 272850/1987 | 11/1987 |
| JP | 236260/1995 | 9/1995 |

* cited by examiner

*Primary Examiner*—Thomas M. Dougherty
*Assistant Examiner*—Leda Pham
(74) *Attorney, Agent, or Firm*—Browdy and Neimark, P.L.L.C.

(57) ABSTRACT

A generator in which connections among winding sets are changed to produce diverse powers different in voltage. Windings are grouped circumferentially in slots into winding sets, which are wound spaced circumferentially 120 electrical degrees apart to provide a three-phase system of windings. Any one winding set produces a low voltage applied to an automotive electrical system. A controller unit connects windings in other winding sets in series and/or in parallel thereby producing powers different in voltage. As an alternative, the stator is comprised of an inside cylinder forming one surface of an air gap, a circular toothed member having teeth arranged circumferentially on the inside cylinder to form sequential slots opened radially outwardly of the stator, and an outside cylinder prepared separately from the toothed member then fit over the toothed member.

16 Claims, 10 Drawing Sheets

GENERATOR WITH DIVERSE POWER-GENERATION CHARACTERISTICS

BACKGROUND OF THE INVENTION

1. Field of the Invention

The present invention relates to a generator having diverse power-generation characteristics, comprising a rotor of permanent magnets mounted on a rotator shaft supported in a stator frame for rotation, and a stator arranged around the rotor.

2. Description of the Prior Art

Modern advanced permanent magnets of high performance have become much employed on a rotor of a generator/motor. Moreover, as the generator/motor having the rotor structure of permanent magnets is high in efficiency of electromechanical energy conversion and simple in construction, its use has recently grown in industrial machines and instruments of various kinds. Then, much research and development have continued to make the generator/motor compact or slim in construction, with even high performance and high power output, and correspondingly necessitated a diversity of parts and components.

In order to increase a torque at low speed in the conventional generator/motors, it is effective to increase the strength of the magnetic field of the stator around the rotor, thereby raising the torque. With the generator/motors, thus, increasing well the torque causes the increase of electromotive force at a low speed, contributing to the provision of commercially viable power source for machines. Among the rotating machinery employing the permanent-magnet rotor is, for example a permanent-magnet rotating machine disclosed in Japanese Patent Laid-Open No. 272850/1987. The prior permanent-magnet rotating machine has a rotor in which permanent magnets are arranged and containers are provided to contain therein magnetic material that is allowed to flow radially owing to the revolution of the rotor to thereby form magnetic pole pieces.

Moreover, another prior art of an a-c generator/motor developing a high-power output is disclosed in Japanese Patent Laid-Open No. 236260/1995, in which a magnetic flux density is controlled in proportion to the rpm of the rotor to adjust properly an amount of the generated amperes or voltages. A control ring is arranged between the rotor and the stator for rotation relatively of them and further a permeable member is provided in such a manner as to come in and out contact with the control ring.

In the meantime, as most automotive electric equipments are designed to require either 12V or 24V, the automotive alternators need to have the generation characteristic capable of feeding the electric power matching to the voltage recited just above. Nevertheless, the d-c power of either 12V or 24V is too low to operate the machinery and instruments mounted on an automobile, in which much power is required for their operation. The low tension is apt to be much subject to transmission loss in the associated wiring. Moreover, a major problem exists in which too thick in cross section of conductor is necessitated for the winding. To cope with this, the alternator is needed producing not only the electric power of low voltage matching to the voltage required for the automotive electric equipments but also another electric power having high tension of about 100V or 200V and so on, which is enough to reduce the transmission loss in the wiring and render the conductor such as winding thin in cross section, thereby making it possible to drive the auxiliaries constructed compact or slim.

With the permanent-magnet generator/motor, the permanent magnet is fixed in magnetic flux density. Thus, the increase of the torque at a low speed needs to either make the permanent magnet large in size or increase the current and also increase the number of loops or turns in the winding to intensify the strength of the magnetic field at the stator side. To realize much torque, it is necessary to make the conductor wound on the stator core heavy in cross section and also the number of turns large to carry much current, thereby increasing the magnetic force of the stator. Nevertheless, too heavy in cross section of the winding conductor laid in a slot of the stator core makes it tough to lead the conductor through the slot between any adjacent teeth in the stator core and embed the windings in the slot of the stator core. In addition, since most the stator core are constructed in such a configuration that the slots are open radially inwardly while the outer periphery is closed with a cylindrical magnetic path, it is much hard to lead the windings through the slot from the inside hollow space in the stator core and wind them on the associated teeth, for the sake of which there has been some tendency to reduce the occupancy of the conductors in the associated slot.

In order to cope with the major consideration stated just earlier on the fabrication of the stator of the generator/motor, there has been conventionally proposed a production method in which teeth of the toothed member for the stator are first laid in juxtaposition and then the winding turns are wound in the slot. Thereafter, the toothed members are assembled into the complete cylindrical configuration. However, yet another problem with the production method recited earlier is to require additional fabricating operation: separating the stator core into many teeth or notching the stator core each tooth.

In the normal electric rotating machines, the windings to produce sinusoidal waveforms are wound spanning some teeth of the stator with either a concentrated-winding or a distributed-winding technique. Nevertheless, the production method recited earlier in which the toothed members are laid side by side is unsuitable for the distributed-wound field winding rather than the concentrated-field winding because the winding loops are not allowed to overlap with each other at the junctions between the adjacent toothed members.

SUMMARY OF THE INVENTION

It is a primary object of the present invention to overcome the problems stated earlier and to provide a generator having diverse power-generation characteristics, in which more than one windings either distributed-wound or concentrated-wound in slots between any adjacent teeth are connected in parallel and/or in series, with changed in combination to ensure powers different in voltage from one another, each of which may be applied across any loads requiring different voltages, for example automotive electric equipments of 12V~24V and auxiliaries such as heaters, largemotors and so on of 100V~200V. Moreover, an object of the present invention is to provide a generator having diverse power-generation characteristics, in which a stator core is formed in a cylindrical configuration with teeth being arranged around the outer periphery of the stator core in a manner extending radially outwardly to provide slots opened radially outwardly, while windings are laid in the slots with either concentrated-winding or distributed-winding to mount the winding on the radially outwardly extended teeth, and a cylindrical magnetic path fits over the radially outwardly extended teeth, on which the windings have been wound, thereby making it possible to manufacture the stator with ease.

The present invention is concerned with a generator with diverse power-generation characteristics, comprising a rotor shaft supported for rotation in a stator frame, a rotor mounted against rotation on the rotor shaft, and a stator arranged around the rotor and fixed to the stator frame, wherein the stator is comprised of an inside cylinder arranged around the rotor to define an air gap between confronting surfaces of them, teeth arranged spaced circumferentially on the inside cylinder to form sequential slots, an outside cylinder surrounding around tooth tips of the teeth, more than one systems of stator windings either concentrated-wound or distributed-wound with a preselected slot span, one of which is low power windings each containing a small number of turns while another of which is high power windings each containing a large number of turns, and terminal lines having terminals connected to any preselected low power and high power windings.

In an aspect of the present invention, a generator is disclosed, wherein the stator has a stator core including a circular toothed member and a cylindrical magnetic path, the circular toothed member being composed of the inside cylinder and the teeth that are integral with the inside cylinder and extend radially outwardly to form the slots opened radially outwardly, and the cylindrical magnetic path being prepared separately from the toothed member and fit over the toothed member.

In accordance with the generator constructed as stated earlier, the stator core with the radially outwardly opened slots contributes to the increase of occupancy of conductors in the slots and also makes it easy to prepare the windings to produce more than one voltages as well as facilitates the change of the voltages, or the change of the desired number of turns in the winding.

In another aspect of the present invention, there is disclosed a generator in which the cylindrical magnetic path is closely press-fit over sequential tooth tips of the teeth of the toothed member, together with a cylinder of soft material superior in magnetic permeability. Moreover, a resinous material is poured on the stator then, followed by solidified to hold in place the stator windings laid in the slots between any two adjacent teeth of the toothed member.

In another aspect of the present invention, a generator is disclosed, wherein the stator windings are led through radially outward slot openings of the slots between the adjacent teeth of the toothed member and wound spanning some slots, while the cylindrical magnetic path fits over the toothed member in which the windings laid in the slots have been held in place with the resinous material.

In another aspect of the present invention, a generator is disclosed, wherein the stator windings concentrated-wound or distributed-wound around a field pole corresponding to any pole of the rotor are shunt from series connections into parallel connections as an rpm of the rotor increases, thus regulating a generated voltage.

In another aspect of the present invention, a generator is disclosed, wherein an electric power produced in the low power windings is supplied to an automotive electric system while an electric power produced in the high power windings is fed to auxiliaries.

In another aspect of the present invention, a generator is disclosed, wherein the produced power is regulated by on-off operations of switches installed in lines connecting the stator windings with the terminals.

In a further another aspect of the present invention, a generator is disclosed, wherein the rotor comprises a permanent-magnet member composed of permanent-magnet pieces arranged spaced from each other around the rotor shaft and resinous adhesives bonding together any adjacent permanent-magnet pieces, and a reinforcing member of non-magnetic property surrounding around the permanent-magnet member, the reinforcing member being coated at the inside surface thereof with adhesives. In addition, a permeable member may be disposed between the rotor shaft and the permanent-magnet member.

More particularly, the present invention relates to a generator with diverse power-generation characteristics, comprising a rotor supported for rotation in a stator frame and having mounted with permanent magnets of multiple poles, and a stator arranged around the rotor and fixed to the stator frame, wherein the stator is composed of a stator core having teeth arranged spaced circumferentially to form sequential slots and confronting an outer periphery of the rotor to define an air gap between them, and more than one windings wound spanning across the slots, the windings being each grouped into three winding sets that are divided circumferentially with a slot span on the stator core, the windings belonging to each winding set being wound displaced in slot circumferentially 120 electrical degrees apart to form a three-phase system of windings, and wherein terminals are distributed uniformly over an inside circumference of the stator such that the windings in a 2nd winding set are arranged in the stator slots so as to overlap with a 1st winding set in waveform of emf, while a 3rd winding set overlaps with the 1st set and the 2nd set in waveform of emf, and a controller unit changes over connections of the terminals every winding sets, thus giving any electric power varied in voltage.

In an aspect of the present invention there is disclosed a generator in which the winding are grouped into any of three and four winding sets, which are laid in the slots displaced circumferentially of the inside cylinder.

In another aspect of the present invention there is disclosed a generator in which an a-c power produced in the windings in the winding sets is rectified at a rectifier circuit, and the resultant rectified power is adjusted by a chopper circuit to a preselected voltage.

In another aspect of the present invention there is disclosed a generator in which the winding sets are each constructed in mutually independent electric power source where the produced power may be used either remained a-c form or converted to d-c form.

In another aspect of the present invention there is disclosed a generator in which terminals of the windings in the winding sets are selectively connected in series and/or parallel by the controller unit, whereby a low tension induced in the windings of the winding sets is consumed in automotive electric systems, whereas a high tension is consumed to energize the heaters incorporated in diesel particulate filters and so on equipped on automotive vehicles and/or to drive the auxiliaries mounted on the vehicles.

In another aspect of the present invention there is disclosed a generator in which the windings for high tension are divided into three winding sets and distributed-wound, the terminals of the windings are selectively connected in series and/or in parallel by the controller unit, and the windings for low tension are concentrated-wound to produce the low tension that is needed to operate the automotive electric system of 24V and so on.

In a further aspect of the present invention there is disclosed a generator in which the controller unit connects all the concentrated-wound winding sets in series to ensure the maximum high tension, connects any of the concentrated-wound windings in series to ensure any tension less than the maximum high tension and further connects all the concentrated-wound windings in parallel to produce the minimum tension.

In another aspect of the present invention there is disclosed a generator in which the controller unit controls an inverter to convert direct to alternating form to drive a motor by the electric power produced in the windings in the winding sets.

In another aspect of the present invention there is disclosed a generator in which the winding sets are such arranged that working windings come in symmetry on generation.

In another aspect of the present invention there is disclosed a generator in which the windings in the winding sets are connected to form either a wye-connection or a delta-connection to provide a three-phase system of windings, and ends of the wye-connected or delta-connected windings are connected in series to the terminals through a relay.

Most automotive electric systems need the power of about 0.5 KW~1 KW at the voltages of 12V~28V, whereas the auxiliaries mounted on the automobile need the power of about 2 KW~3 KW. If someone could get the voltages of 12V~28V to cover the power of about 2 KW~3 KW for the auxiliaries, the current value would become too large, thus causing power loss with much heating. As opposed to the condition stated earlier, the auxiliaries or auxiliary machinery is allowed to operate on the high tension of about 100V~200V, thus involved in no problem of power loss in the wiring. Accordingly, the winding adapted to produce the high tension supplied to the auxiliaries, for example is allowed to make slender or thin the conductor in cross section, thereby contributing to rendering the generator slim in construction and light in weight. Besides, when any relay is used, the voltage may be more increased with the result of less current, thus protecting any contact against possible fusion.

With the generator according to the present invention, simply connecting in series and/or in parallel the terminals of the windings in the winding sets is sufficient to produce any of high, medium and low tensions. That is to say, the controller unit connects all the three winding sets in series to ensure the maximum high tension, and connects any two of the windings in series or connects all the windings in parallel as the desired tension reduces to any tension below the maximum high tension. The high tension given by the series connections of the windings in the winding sets is consumed, for example to energize the heaters incorporated in diesel particulate filters and so on equipped on automotive vehicles and/or to drive the auxiliaries mounted on the vehicles. The low tension produced by the parallel connections of windings in the winding sets is uses for the automotive electric systems.

With the stator employed in the generator of the present invention, the stator windings, as being allowed to be led through radially outward slot openings of the slots between the adjacent teeth of the toothed member, may be distributed-wound or concentrated-wound on the stator core with ease, thus helping ensure the stator rich in reliability. Especially, the windings in the winding sets distributed-wound or concentrated-wound on the stator core are distributed circumferentially in slot every phase and every pole in a manner the magnetic figures are displaced stepwise and the winding curves verge on the sinusoidal form. This makes it possible to make the windings in the slots with efficiency and ease.

With the generator constructed according to the present invention, any one power developed in the low-power windings serves as the power necessary for energizing the automotive electric systems while another power produced in the high-power winding is used for the actuation of the auxiliaries such as the heater of the diesel particulate filter, air-conditioner and the power-take-off or the like. The winding connections for high power to generate the high tension may reduce the current value, which is needed of gaining the desired power, thus rendering the conductor small in cross section. This makes it possible to provide the generator compact or slim in overall construction, with even lower transmission loss in the wiring.

Power (W) of the generator, in general, is expressed as W=S×N×Φ, where S is rpm of the rotor, N is the number of turns and Φ is the magnetic flux density. With the equation stated just above, since both the rpm(S) of the rotor and the flux density (Φ) are assumed constant, the increase of the power (W) will be realized only as the number (N) of the turns increases.

Most prior generators make it tough in construction to wind the conductor on the stator core. To cope with the tough problem on winding operation, the stator core in the generator of the present invention is constructed in such a manner that the slots between any adjacent teeth are open radially outwardly of the stator. This construction of the stator core makes it easy to distributed-wind or concentrated-wind two types of the windings on the stator core, which differ in the number of turns, to thereby provide the generator having the diverse power-generation characteristics.

Effective emf ($E_1$) per one pole is given by the equation: $E_1=(\sqrt{2})\pi f\ \Phi_m$ where f is the frequency and $\Phi_m$ is the effective magnetic flux per a pole.

The effective emf ($E_{1m}$) in light of the number of turns is expressed as $E_{1m}=(\sqrt{2})\pi f\ \Phi_m \cdot k_w\ N_1$ where $k_w$ is the winding factor and $N_1$ is the overall number of the windings. That is, the efficiency is somewhat dependent on the winding factor.

In the generator having the multi-pole permanent-magnet rotor, for example, the first windings to produce the power for the vehicle are divided into a winding group less in the number of turns and another winding group more in the number of turns. Each winding group is composed of windings wound, each spanning a slot per one pole, and other windings wound, each spanning across an empty slot and an opposite slot, all the windings being wound sequentially in series. In the stator where the windings are made on the stator core as explained above, it will be reasoned based on the above $E_{1m}$ that the small power is produced by the windings small in the number of turns while the large power is developed by the windings large in the number of turns.

With the generator having the stator core on which the windings are wound in a manner as stated earlier, all the windings less in the number of turns are connected in series when the rpm of the rotor is small. The produced power is converted through to a pulsating current, which is in turn rectified through coils and condensers. As the rpm of the rotor increases, the power is taken out from a half or a third of the all windings the, followed by rectification. As an alternative, the system may be employed, in which the negative sides of the a-c are cut. Thus, when the vehicle loads are regulated with the battery voltage in matching with the tension regulation stated just above, the d-c steady in voltage ranging over the whole operating range may be ensured. On the other hand, the windings having a large absolute number of turns have the ability to produce power of 100V at even low rpm. When the rpm of the rotor goes too high, the voltage may be regulated as in the windings less in the number of turns. Moreover, the three-phase a-c to drive the induction motor may be provided by any inverter.

In the generator of the present invention, the windings are allowed to be wound on the stator core by laying the conductor in the slots through the outward slot openings from the outside of the toothed member rather than by leading the conductor through the slots inside the stator core as in the conventional stator production. Thus, the winding operation may be performed with much ease. The windings laid in the slots are then held in place with resinous material and the cylindrical magnetic path is press-fit over the radially outward tooth tips of the toothed member. Thus, the stator may be completed with ease. According to the present invention, the windings, prior to the pres-fit of the cylindrical magnetic path over the toothed member, are concentrated-wound or distributed-wound on the stator core by laying the conductor in the slots through the outward slot openings from the outside of the toothed member. This construction improves the production efficiency of the stator and succeeds in providing the reliable stators. The windings distributed-wound or concentrated-wound on the stator core are distributed circumferentially in slot every phase and every pole in a manner the magnetic figures are displaced stepwise and the winding curves verge on the sinusoidal form. This makes it possible to lay the windings in the slots with efficiency and ease.

With the generator according to the present invention, any one power developed in the low-power windings serves as the power necessary for energizing the automotive electric systems while another power produced in the high-power winding is used for the actuation of the auxiliaries such as the heater of the diesel particulate filter, air-conditioner and the power-take-off or the like. The winding connections for high power to generate the high tension may reduce the current value, which is needed of gaining the desired power, thus rendering the conductor small in cross section. This makes it possible to provide the generator compact or slim in overall construction, with even lower transmission loss in the wiring.

Other objects and features of the present invention will be more apparent to those skilled in the art on consideration of the accompanying drawings and following specification wherein are disclosed preferred embodiments of the present invention with understanding that such variations, modifications and elimination of parts may be made therein as fall within the scope of the appended claims without departing from the spirit of the invention.

DETAILED DESCRIPTION OF THE PREFERRED EMBODIMENTS

A generator with diverse power-generation characteristics in accordance with the present invention will be hereinafter described with reference to the accompanying drawings.

The present generator is suitable for use, for example in the generators combined with an automotive engine, generators incorporated in an engine for cogeneration system, generators attached to an output shaft of an engine for a hybrid vehicle, generators combined with a turbocharger to reclaim heat energy from exhaust gases, or generators mounted to energy recovery means.

Figure 1:
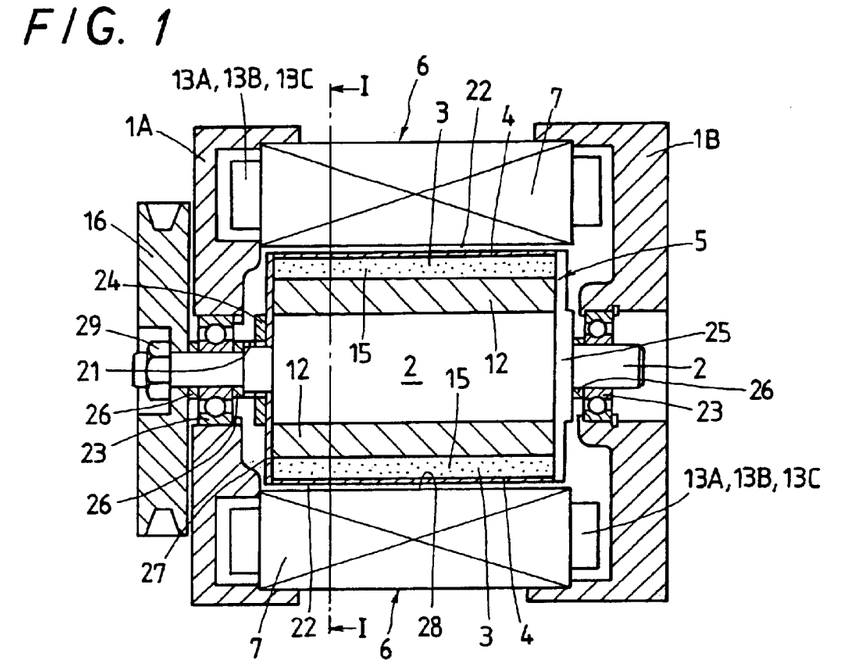
FIG. 1 is an axial sectional view showing a preferred embodiment of a generator with diverse power-generation characteristics in accordance with the present invention.

The generator of the present invention, as shown in FIG. 1, is comprised of a pair of frame halves 1A and 1B, a rotor shaft 2 supported for rotation by means of axially opposite ball bearings 23 through washers 26, a rotor 5 of permanent-magnet pieces 3 arranged around and fixed to the rotor shaft 2, and a stator 6 arranged around the outer periphery of the rotor 5 to define an air gap 22 between them and fixed to the frame halves 1A and 1B. Thus, the rotor 5 is accommodated in a cylindrical hollow 28 for rotation with keeping the air gap 22 of a preselected radial clearance. The rotor 5 is clamped between axially opposite backing plate 25 and retainer plate 27, which are abutted against axially opposing ends of the rotor 5, each to each end, and kept on the rotor shaft 2 against rotation by tightening a nut 29 on a threaded end 21 of the rotor shaft 2. A generator pulley 16 fixed to any one end of rotor shaft 2 with a nut 29 is connected through a belt to a rotating shaft, turbine shaft, driving shafts for compressor and so on, which are connected to the engine through any transmission system.

Figure 2:
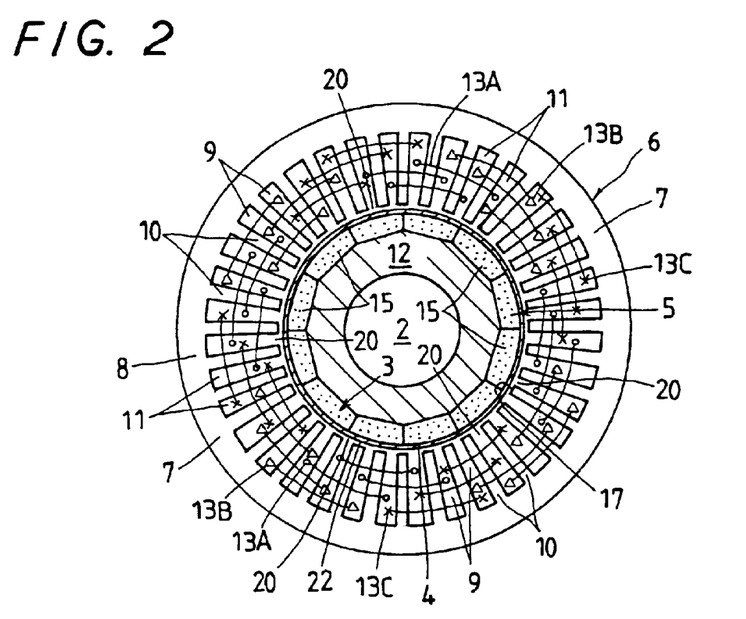
FIG. 2 is a cross-sectioned view taken along the plane I—I of FIG. 1 to illustrate concentrated-field windings or distributed-field windings on a stator core.
Figure 3:
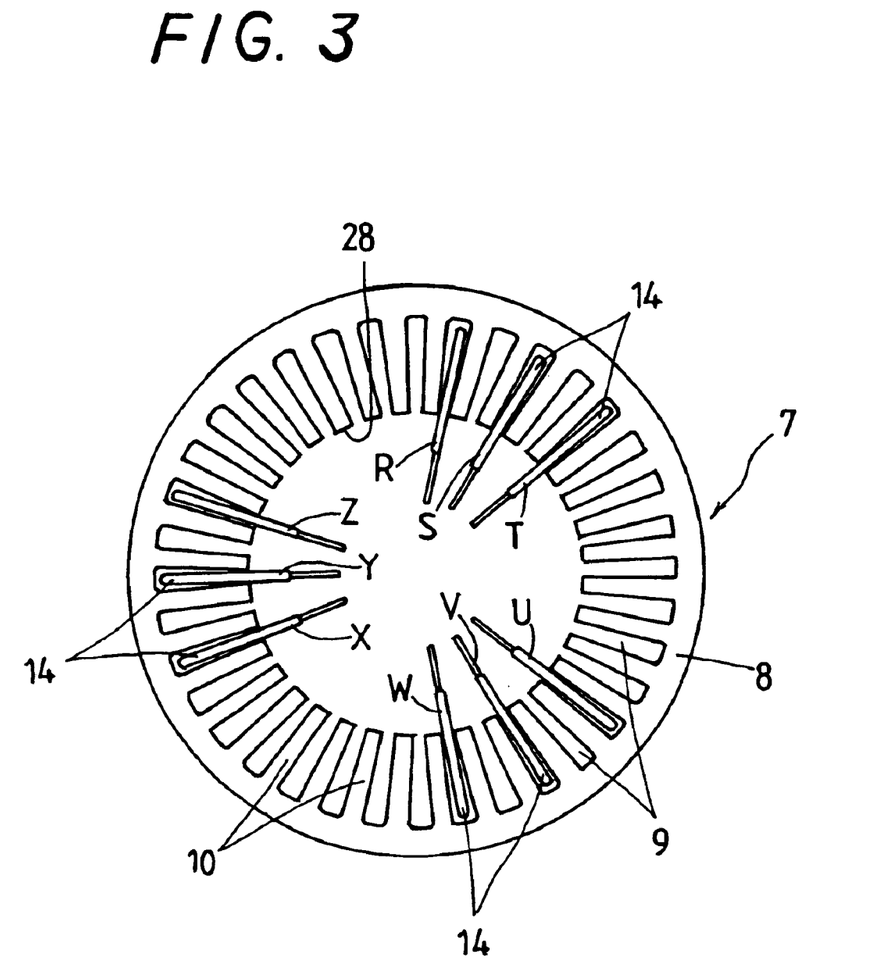
FIG. 3 is a plan view showing a stator core.
Figure 5:
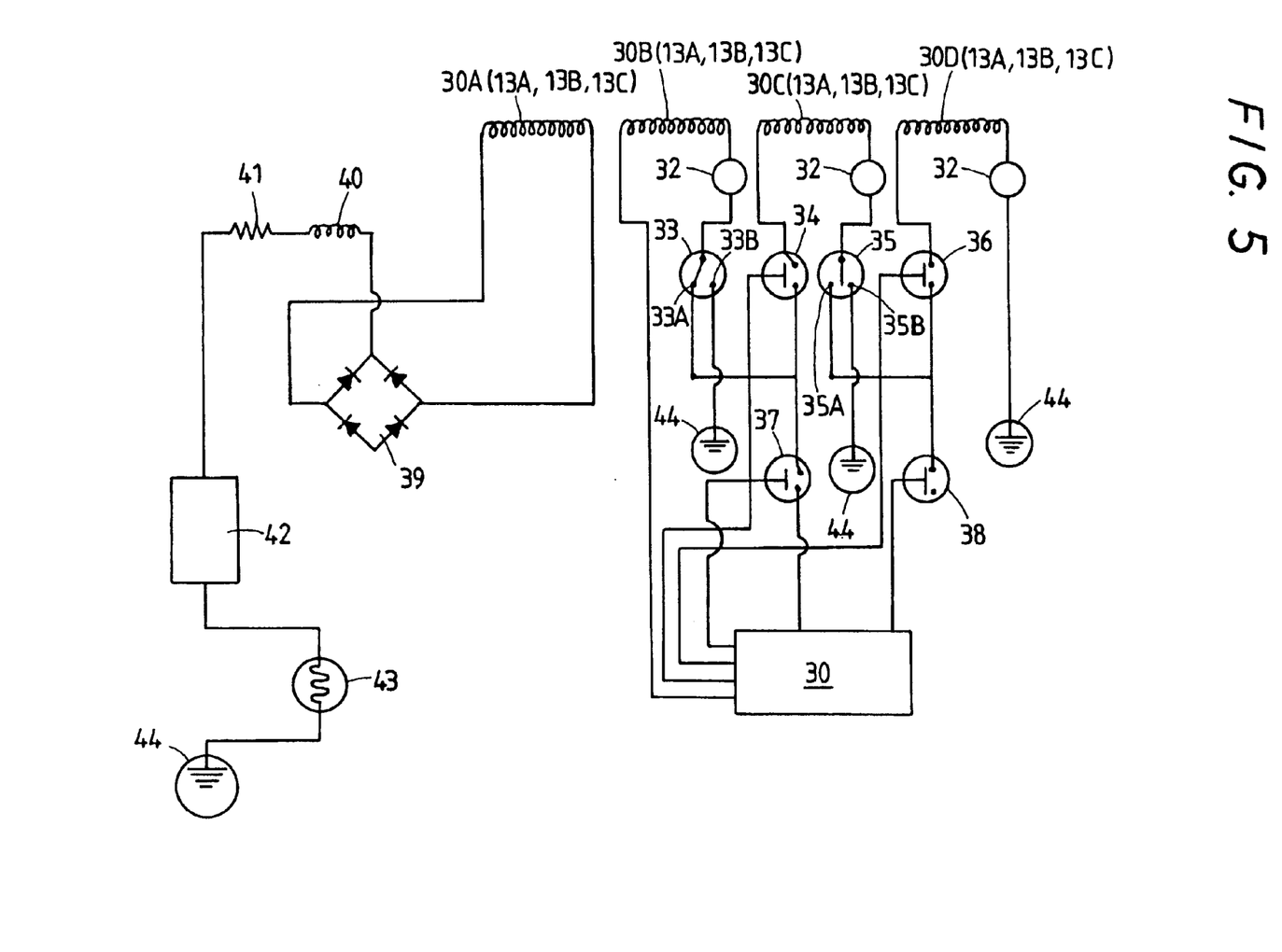
FIG. 5 is a wiring diagram explaining circuit connections of the windings in the generator of FIG. 1.

As seen from FIGS. 2 and 3, the stator 6 comprises a stator core 7 constructed of an outside cylindrical magnetic path 8 with stator teeth 10 arranged spaced circumferentially apart from each other to separate two adjacent stator slots 9, which open onto or near the air gap 22 kept between the outer periphery of the rotor 5 and the tooth tips 28, and windings 13A, 13B and 13C wound on stator teeth 10 with spanning some stator slots 9 each of which is between any two adjacent teeth 10 of the stator core 7. As shown in FIG. 5, the windings 13A, 13B and 13C are each grouped into three winding sets 30A, 30B, 30C and 30D that are divided circumferentially regarding the stator slots 9 of the stator core 7. The windings 13A, 13B and 13C belonging to any one winding set 30A, 30B, 30C or 30D are each distributed-wound or concentrated-wound and shifted from each other in the stator slots 9 to form a three-phase system of windings. With the generator stated earlier, a controller unit 30 switches over connections among terminals 14 of the windings 13A, 13B and 13C belonging to any one winding set 30A, 30B, 30C or 30D to produce any electric powers varied in voltage. As will be seen from FIG. 5, the winding set 30A is adapted to produce a current of low voltage directed to automotive electric equipments of 12V~24V, so that the windings 13A, 13B and 13C in the winding set 30A are concentrated-wound. Other winding sets 30B, 30C and 30D are each split into three parts and distributed-wound for producing electric power of high voltage. The operation of the controller unit 30 connects the terminals 14 of the windings 13A, 13B and 13C in series and/or in parallel.

Figure 4:
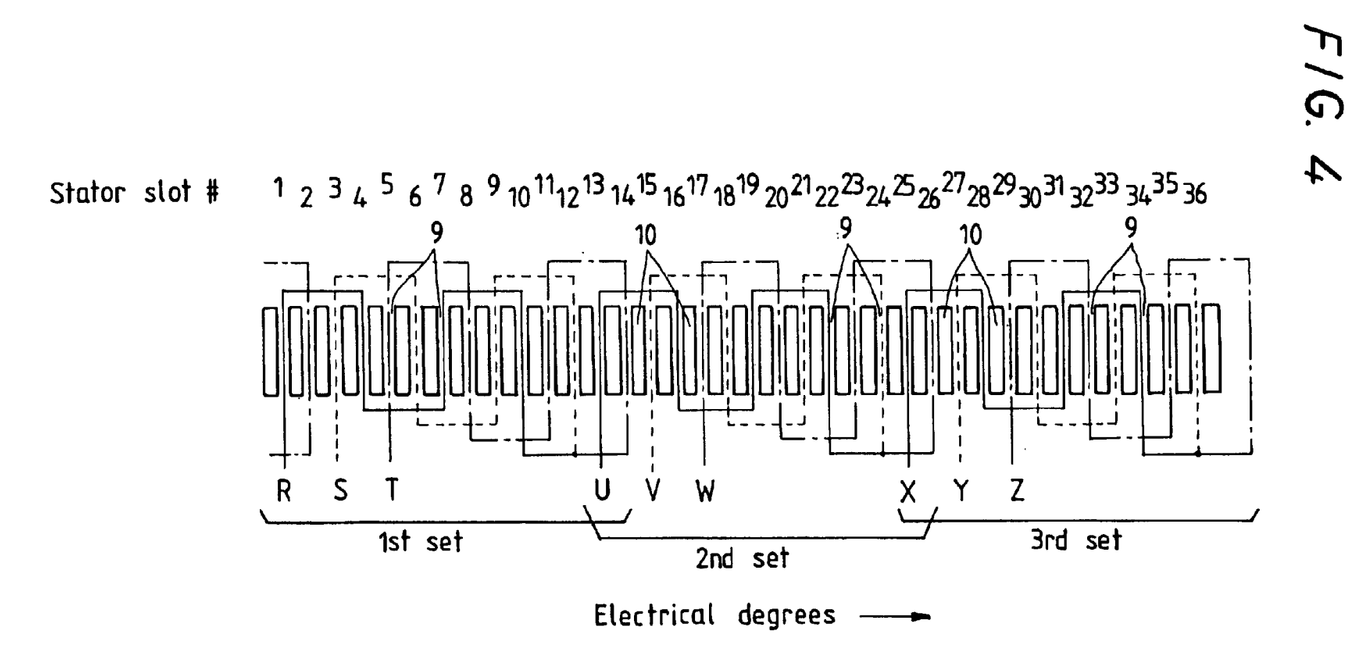
FIG. 4 is a schematic illustration explanatory of windings mounted on the stator core.

The winding sets 30A, 30B, 30C and 30D, as shown in FIG. 4, are grouped into three or four sets: 1st set (R, S, T), 2nd set (U, V, W) and 3rd set (X, Y, Z) laid in the stator slots of the stator core, which are displaced circumferentially from each other. In FIG. 4, the windings R, U and X are represented by a solid line while the windings S, V and Y are shown by a dotted line and the windings T, W and Z are represented by a dot-and-dash line. The stator slots 9 in FIG. 4 are numbered in one consecutive series from no. 1 to no. 36 for convenience of explanation while the three windings 13A, 13B and 13C in any winding set 30A, 30B, 30C or 30D are spaced 120 electrical degrees apart on the stator teeth 10 to provide the three-phase system of windings helping ensure a preselected voltage. Moreover, an alternating-current induced by the three windings 13A, 13B and 13C in the winding set 30A, as shown in FIG. 5, is rectified or changed to d-c, which is in turn adjusted through a chopper circuit in a voltage regulator 42 to a voltage needed for the automotive electric systems. Other winding sets 30B, 30C and 30D are arranged such that working windings come in symmetry on generation.

Figure 7:
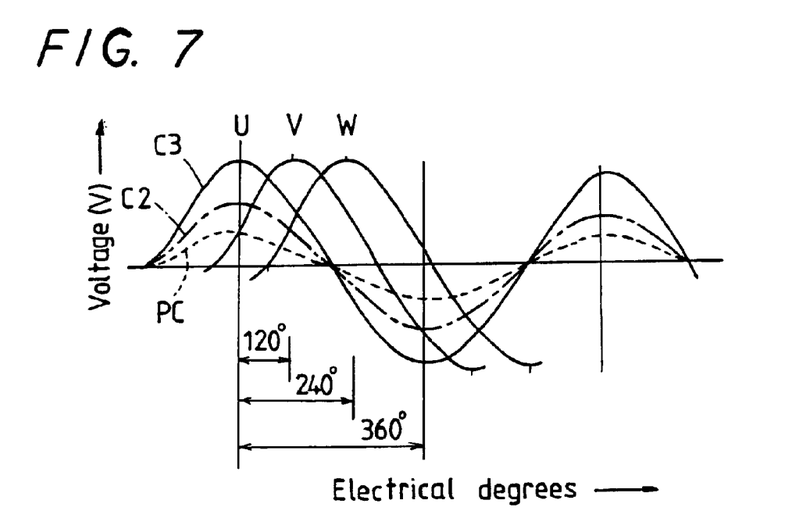
FIG. 7 is a graphic representation showing three-phase currents created in the generator of the present invention.

As shown in FIGS. 2 to 5, the windings 13A, 13B and 13C are grouped into winding sets 30B, 30C and 30D circumferentially regarding the stator slots 9 on the stator core 7. The three winding sets 30B, 30C and 30D are wound in the stator slots 9 spaced circumferentially 120 electrical degrees apart to form the three-phase system of windings. Thus, the terminals 14 are distributed uniformly over the inside circumference of the stator such that the windings in the 2nd set (U, V, W) are arranged in the stator slots 9 so as to overlap with the 1st set (R, S, T) in waveform of emf, while the 3rd set (X, Y, Z) may overlap with the 1st set (R, S, T) and the 2nd set (U, V, W) in waveform of emf. On operation of the generator stated earlier, any terminals 14 of the winding sets 30B, 30C and 30D are controlled to make connections by the controller unit 30, thus giving any electric power varied in voltage. In FIG. 7, a dotted curve PC denotes a low tension at electrical degrees where the windings 13A, 13B and 13C are connected in parallel or remain alone, while a dot-and-dash curve C2 is a medium tension at other electrical degrees where any two windings out of the windings 13A, 13B and 13C are connected in series. A solid curve C3 corresponds to a high tension at further other electrical degrees when all the three windings 13A, 13B and 13C are connected in parallel.

Figure 8:
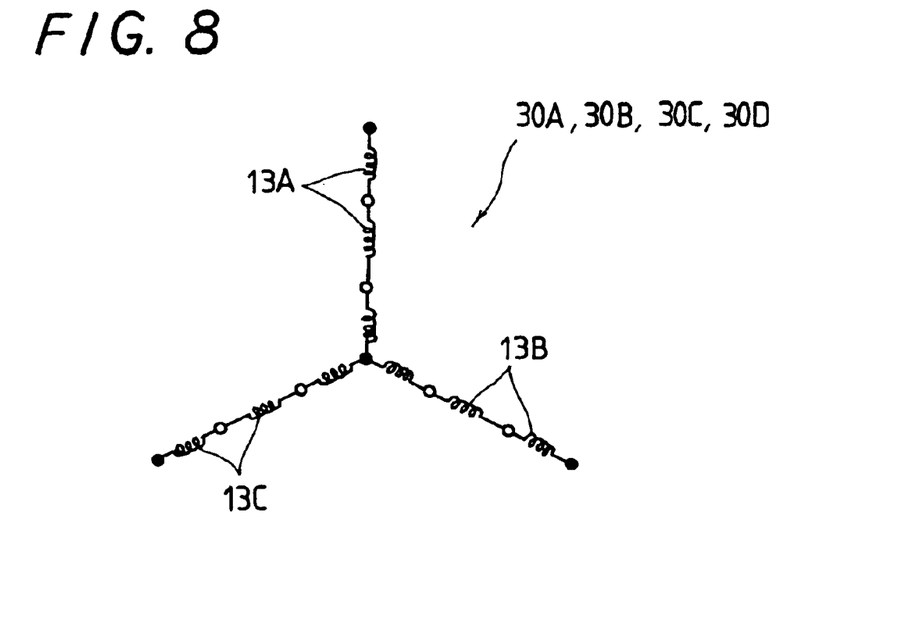
FIG. 8 is an illustration explanatory of wye-connected winding sets.
Figure 9:
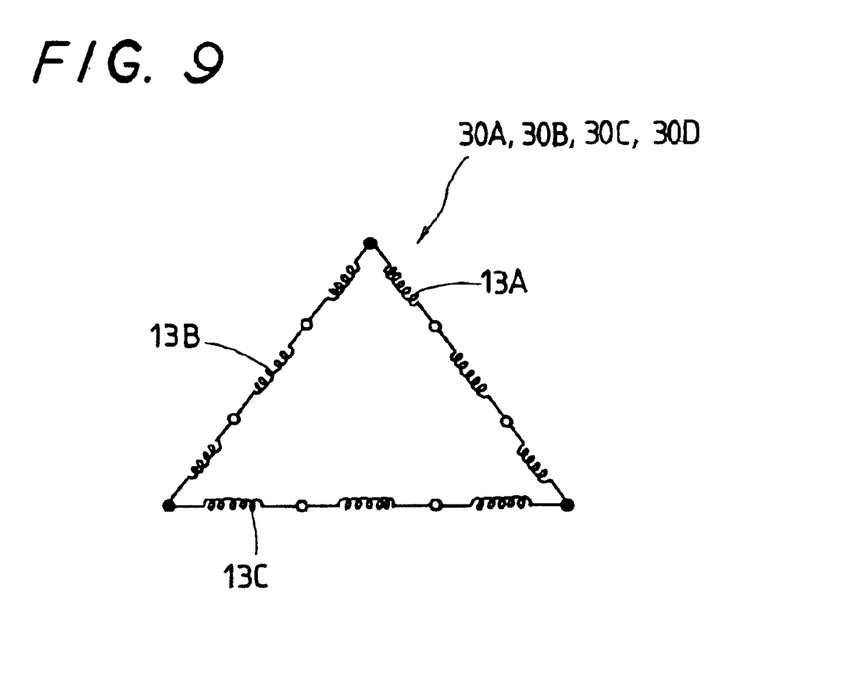
FIG. 9 is an illustration explanatory of delta-connected winding sets.

As shown in FIG. 5, the terminals 14 of the windings 13A, 13B and 13C in the winding sets 30B, 30C and 30D are selectively connected in series and/or parallel by the controller unit 30. As a result, the high tension induced in the windings 13A, 13B and 13C of the winding sets 30B, 30C and 30D is intended to be consumed to energize the heaters incorporated in diesel particulate filters and so on equipped on automotive vehicles and/or to drive the auxiliaries mounted on the vehicles. The winding sets 30B, 30C and 30D are arranged such that working windings come in symmetry on generation. Moreover, the windings belonging to each winding set makes either wye-connection as shown in FIG. 8 or delta-connection as shown in FIG. 9 to provide the three-phase currents. Ends of the wye-connected or delta-connected windings are connected in series.

The controller unit 30 operates to connect the three winding sets in series with each other to ensure the maximum high tension, whereas the voltages lower than the maximum high tension may be produced by either the series connection of any two winding sets or the parallel connection of the three winding sets. Moreover, the controller unit 30 controls an inverter to convert direct to alternating form to drive a motor by the electric power induced at the windings in the winding sets.

The stator core 7 constituting the stator 6 is formed of a toothed member where the cylindrical magnetic path 8 is integral with the teeth 10. The cylindrical magnetic path 8 is made of soft material superior in permeable property. In the stator 6, the windings 13A, 13B and 13C laid in the slots 9 between the adjacent teeth 10 are held firmly in the slots 9 with resinous material that has been poured then, followed by solidification. Moreover, the windings 13A, 13B and 13C are led through slot openings 20 between the adjacent teeth 10 and then wound up with spanning the slots 9.

Although but four 3-phase power supply lines of winding sets are shown as the illustrative example in FIGS. 2 and 5, it will be understood from FIGS. 2 and 4 that the three-phase currents U, V, W (in FIG. 4. other reference characters R, S, T and X, Y, Z are given for convenience of understanding) are induced in each winding set including the winding 13A (current U is marked with ○), the winding 13B (current V is with Δ) and the winding 13C (current W is with x ), which are concentrated-wound or distributed-wound with a preselected slot span.

The stator 7 contains the windings 13A, 13B and 13C that are concentrated-wound or distributed-wound on the stator core so as to produce the three phase currents U, V and W spaced 120 electrical degrees apart as shown in FIG. 7. In FIG. 4 in which there is shown in development an example of windings spaced 120 electrical degrees apart on the stator, the 1st winding set GI for the three phase currents R, S and T, 2nd winding set G2 for the three phase currents U, V and W, and 3rd winding set G3 for the three phase currents X, Y and Z are wound on the teeth 9 with a preselected slot span, respectively. The stator 6 is chiefly comprised of the toothed stator core 7 of the cylindrical magnetic path 8 with the teeth 10 arranged spaced circumferentially on the magnetic path 8, the windings 13A, 13B and 13C wound across the slots 9 between any two adjacent teeth 10 with a preselected slot span, and non-magnetic resinous material poured then, followed by solidified to solidly keep the windings 13A, 13B and 13C in the associated slots. Besides, the resinous material is made of any heat-stable material hard to be fused owing to heat emanated from the windings 13A, 13B and 13C.

A rotor 5 comprises, for example the rotor shaft 2, a magnetically permeable member 12 of laminated silicon steel sheets arranged on the rotor shaft 2, a permanent-magnet member 3 composed of arced permanent-magnet pieces 15 arranged spaced from each other around the permeable member 12 in the form of cylindrical configuration and resinous adhesives bonding together any adjacent permanent-magnet pieces 15, and a reinforcing member 4 of non-magnetic heat-resisting alloy surrounding around the permanent-magnet member 3, the reinforcing member 4 being coated at the inside surface thereof with adhesives. As an alternative, the reinforcing member 4 may be made of a reinforcing tube wound with multi-layered sheets of austenite structure lest the induced current occurs in reinforcing tube. Besides, the resinous adhesives are made of any heat-stable material hard to be fused owing to heat emanated from the windings 13A, 13B and 13C.

The windings 13A, 13B and 13C belonging to any of the winding sets 30A, 30B, 30C and 30D are each distributed-wound or concentrated-wound around a field pole corresponding to any pole of the rotor 5. With the generator of the present invention, the series connections 36, 37 and 38 are shunted into parallel connections as the rpm of the rotor 5 increases, thus regulating the generated voltage. At the series connections 36, 37 and 38, either all the four windings or any three windings are connected in series with one another. Switches 33, 34, 35, 36, 37 and 38 are provided in lines, each to each line, where rectifiers 32 are connected to the windings 13A, 13B and 13C.

With the generator constructed as stated earlier, the on-off operation of the switches 33, 34, 35, 36, 37 and 38 serves regulating the generated voltage, for example as seen from Table 1 and FIG. 5. Moreover, only the winding set 30A contributes to the electric power for the load 43 as shown in FIG. 5. The electric power produced in the winding set 30A flows through a bridge circuit 39, a voltage stabilizing coil 40 and a resistor 41 to the voltage regulator 42 with the chopper circuit, where the electric power is controlled to be consumed in the load 43 that is grounded at 44 in FIG. 5.

TABLE 1

| Switch # | 33 | 34 | 35 | 36 | 37 | 38 |
|---|---|---|---|---|---|---|
| Winding connections for high tension | 33A ON | ON | 35A ON | ON | OFF | OFF |
| Winding connections for medium tension | 33A ON | ON | 35B ON | OFF | OFF | OFF |
| Winding connections for low tension | 33B ON | ON | 35B ON | ON | ON | ON |

Figure 6:
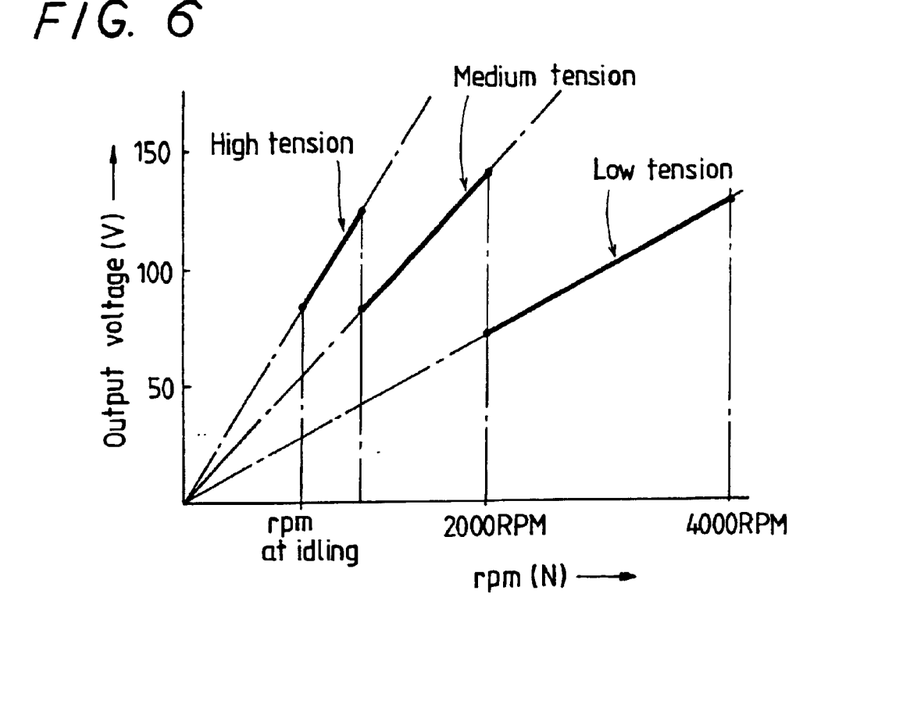
FIG. 6 is a graphic representation showing relations between rpm and output voltage occurring in the circuit connections in FIG. 5.

When the controller unit 30 issues an instruction, for example to control the circuit in FIG. 5 in accordance with the ON-OFF operation represented in Table 1, the winding sets 30A, 30B, 30C and 30D are controlled to make series connection and/or parallel connection, thus realizing any tension of high, medium and low tensions. The high tension will be provided at the event where all the winding sets 30A, 30B, 30C and 30D are connected in series, the medium tension is at the event where any two out of the winding sets 30A, 30B, 30C and 30D are connected in series, and the low tension is at the event the winding sets 30B, 30C and 30D are connected in parallel. The resultant output voltage V varies, for example as shown in FIG. 6, for each of the high, medium and low tensions. Thus, the winding sets 30A, 30B, 30C and 30D are each constructed in mutually independent electric power source where the induced power may be used either remained a-c form or converted to d-c form. For instance as tabulated in Table 1, the high tension is given when the controller unit 30 turns on the switches 33A, 34, 35A and 36, while turns off the switches 37 and 38, thus making the series connection of all the winding sets 30A, 30B, 30C and 30D. The medium tension is obtained when the controller unit 30 turns on the switches 33A, 34 and 35B, while turns off the switches 36, 37 and 38, thus making only the winding sets 30B and 30C connect in series and the winding set 30D null. The low tension is realized when the controller unit 30 turns on the switches 33B, 34, 35B, 36, 37 and 38, thus making the winding sets 30B, 30C and 30D connect in parallel.

Another embodiment of the generator with diverse power-generation characteristics in accordance with the present invention will be hereinafter described with reference to FIGS. 10 to 16.

Figure 14:
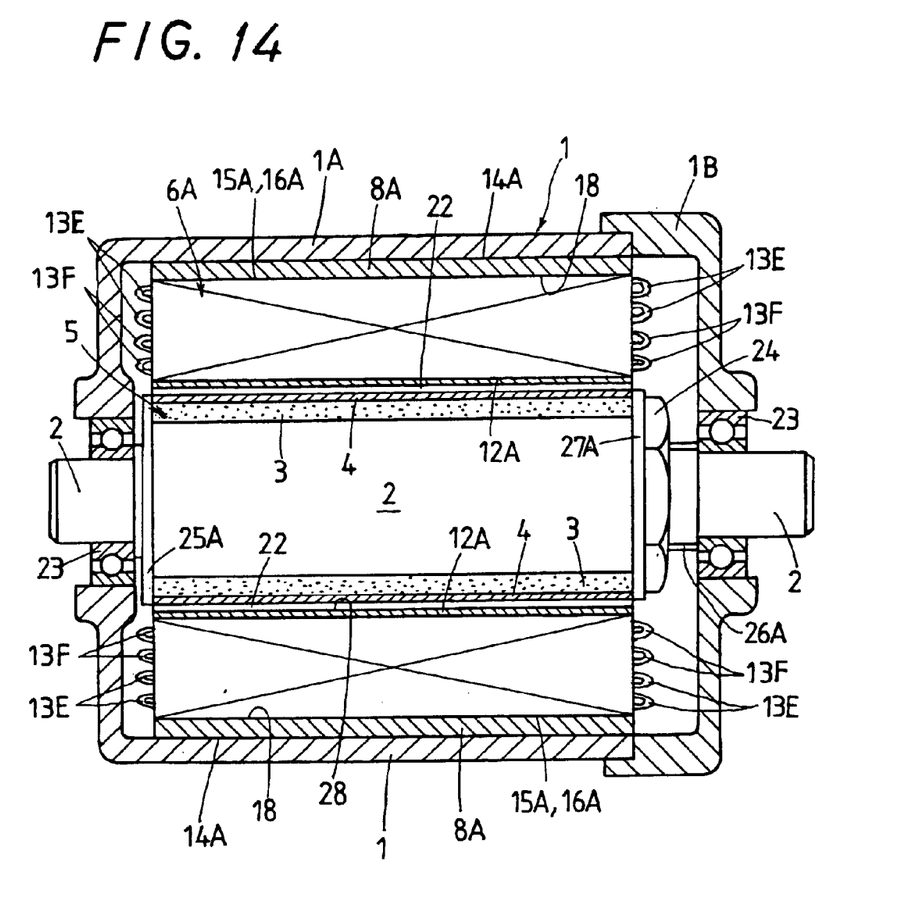
FIG. 14 is an axial sectional view showing the generator shown in FIG. 10.

The generator according to the second embodiment of the present invention, for example as shown in FIG. 14, includes a stator frame 1 of a pair of frame halves 1A and 1B, a rotor shaft 2 supported in the stator frame 1 for rotation through a pair of ball bearings 23, a rotor 5 of permanent magnet mounted on the rotor shaft 2 against rotation, and a stator 6A fixed in the stator frame 1 so as to provide a clearance or an air gap 22 extending around the periphery of the rotor 5 between them. The rotor 5 is contained in a cylindrical hollow 28 for rotation with keeping the air gap 22 of a preselected radial clearance. The rotor 5 is clamped between axially opposite backing plate 25A and washer 27A, which are abutted against axially opposing ends of the rotor 5, each to each end, and kept on the rotor shaft 2 against rotation by tightening a fixing nut 24 on a threaded end 26A of the rotor shaft 2. It will be noted that the rotor shaft 2 is connected to an output shaft of the engine or a turbine shaft, and so on through either a generator pulley fixed to the shaft end or any transmission system.

Figure 10:
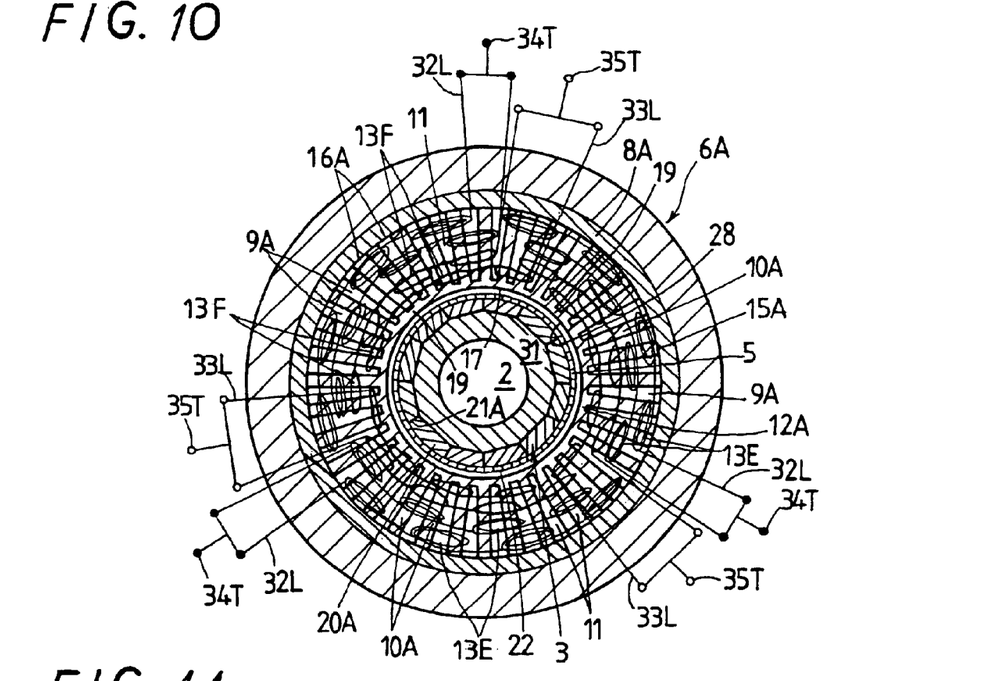
FIG. 10 is a cross section showing another embodiment of a generator with diverse power-generation characteristics in accordance with the present invention.
Figure 11:
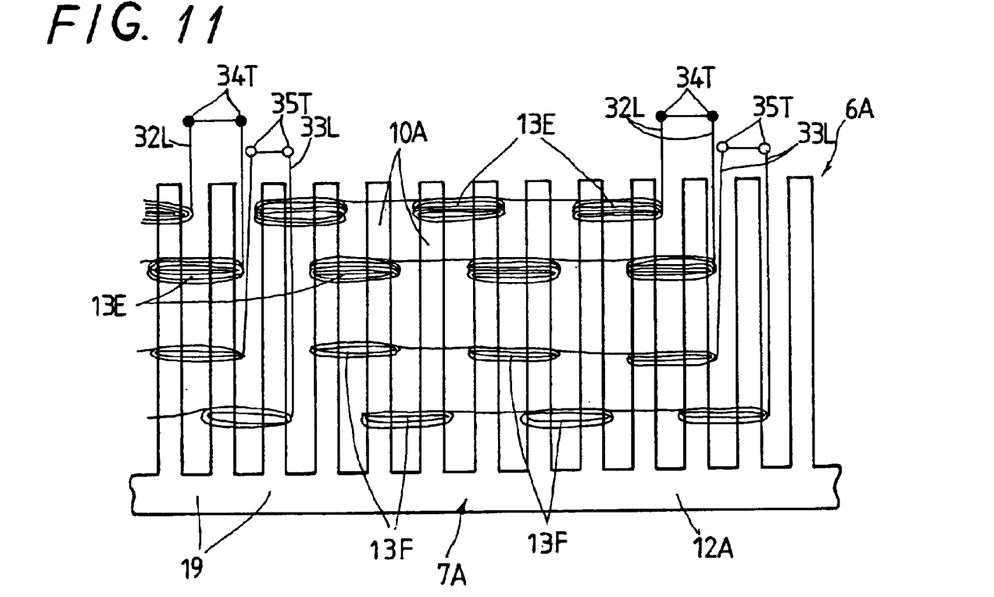
FIG. 11 is a schematic illustration explanatory of concentrated-field windings or distributed-field windings on radially outwardly extended teeth of the stator shown in FIG. 10.
Figure 12:
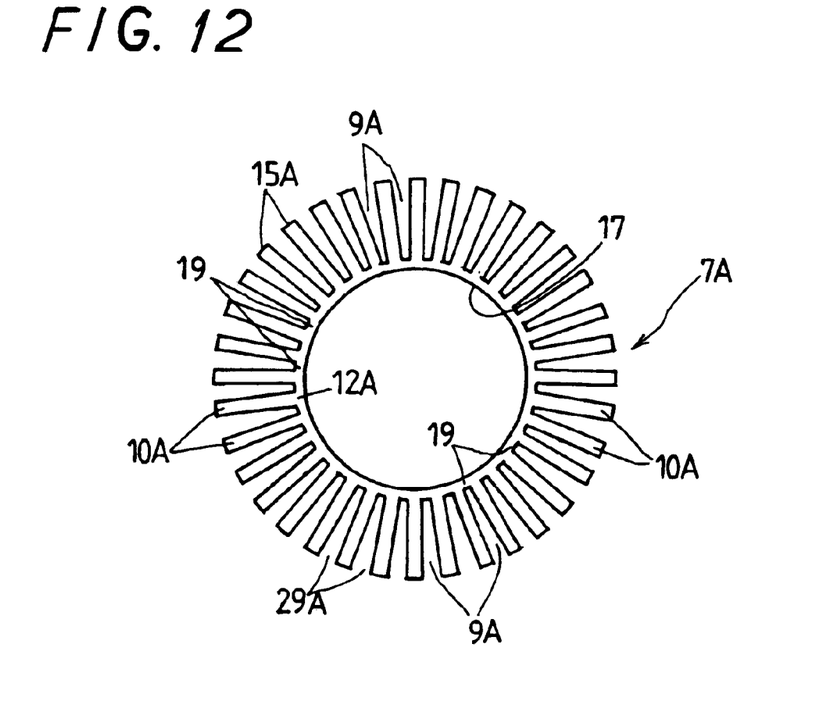
FIG. 12 is an end elevation of the radially outwardly extended teeth of the stator in FIG. 10.

With the generator according to the second embodiment of the present invention, two types of stator windings, as shown in FIGS. 10 and 12, are concentrated-wound or distributed-wound on stator teeth 10A with any preselected slot span, one stator winding 13F of which is a low power winding less in the number of turns, another stator winding 13E being a high power winding more in the number of turns. The preselected low power windings 13F and high power windings 13E are respectively connected with terminal wires 32L and 33L having terminals 34T and 35T, each to each wire.

Figure 13:
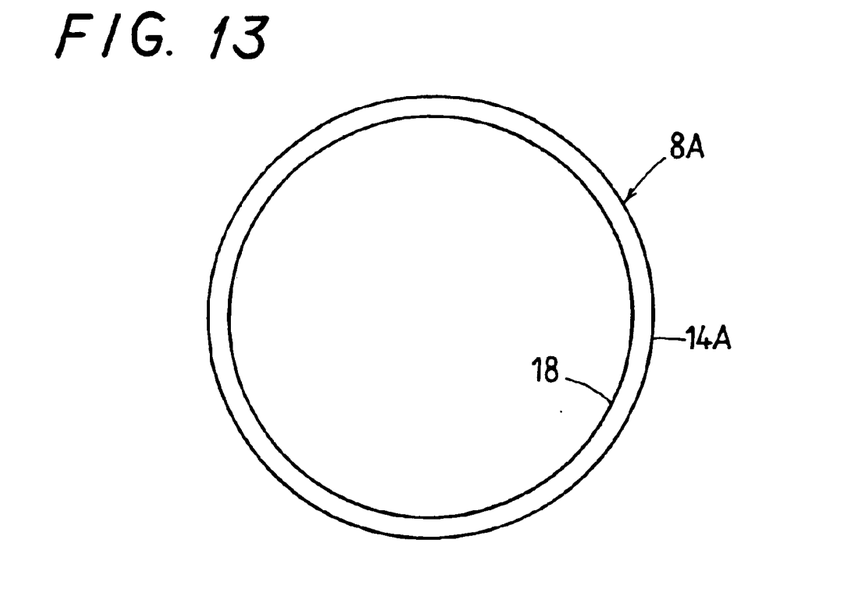
FIG. 13 is an end elevation of a cylindrical magnetic path fit over the radially outwardly extended teeth of the stator in FIG. 12.

A stator core of the stator 6A is constructed with a circular toothed member 7A with radially outwardly extended teeth 10A, refer to FIG. 12, and a cylindrical magnetic path 8A, refer to FIG. 13, prepared separately from the toothed member 7A.

Thus, two stator windings 13E and 13F are concentrated-wound or distributed-wound on the stator core for producing three phase currents. The stator 6A is chiefly comprised of the toothed stator core 7 of an inside cylinder 12A with the teeth 10A arranged spaced circumferentially apart from each other on the radially outside surface of the inside cylinder 12A, the windings 13E, 13F wound across the slots 9 between any two adjacent teeth 10A with a preselected slot span, non-magnetic resinous material 11 poured then, followed by solidified to solidly keep the windings 13E, 13F in the associated slots 9A, and a cylindrical magnetic path 8A close-fitted at an inside surface 18 thereof on both a radially outside periphery of the resinous material 11 solidified to keep the windings 13E, 13F in the slots 9A and tooth tips 15A of the radially outwardly extended teeth 10A, while jointed at an outside surface 14A to the stator frame 1.

With the circular toothed member 7A constructed as stated earlier, after the windings 13E have been wound across the slots 9A then, followed by held in place with the solidified resinous material 11, the inside cylinder 12A is finished along an inner periphery thereof to a desired inside diameter to make the hollow 28 for accommodating the rotor 5 therein, with bridges 19 remaining to joint together the adjacent teeth 10A. Besides, the resinous material 11 is made of any heat-stable material hard to be fused owing to heat emanated from the windings 13E.

On manufacturing the stator 6, the circular toothed member 7A and the cylindrical magnetic path 8A are produced separately for the stator core. The circular toothed member 7A consists of the inside cylinder 12A along the outside periphery of which are arranged spaced circumferentially teeth 10A, which are integral with the inside cylinder 12A and extended radially outwardly of the inside cylinder 12A. According to the circular toothed member 7A stated earlier, the slots 9A between any two adjacent teeth 10A are found opened radially outwardly at 29A on the outer side of the inside cylinder 12A. The construction in which the slot opening 29A of the slot 9A between any two adjacent teeth 10A is found radially outwardly of the circular toothed member 7A helps facilitate the winding operation that the windings 13E, 13F wound across the preselected slot span should be wound in the associated slots 9A through the narrow slot openings 29A. On making the windings 13E and 13F, for example, the winding 13F are first concentrated-wound or distributed-wound in the slots 9A between the adjacent teeth 10A of the circular toothed member 7A at locations near the radially inward bottom of each slot 9A and then the windings 13E are concentrated-wound or distributed-wound in the slots 9A at locations near the radially outward slot opening 29A of each slot 9A.

Subsequent to the winding operation in which the windings 13E, 13F are wound in the slots 9A between any adjacent teeth 10A of the circular toothed member 7A, the resinous material 11 is poured in the slots 9A then, followed by solidified to hold in place the windings 13E, 13F in the associated slots 9A. Then, the circular toothed member 7A is finished to the desired outer dimension by grinding an outer periphery 16A of the resinous material 11 together with the tooth tips 15A of the teeth 10A. The finished product of the circular toothed member 7A is press-fitted in the cylindrical magnetic path 8A then, followed by jointed together by welding and so on. Although not shown, as an alternative, the circular toothed member 7A may be closely press-fitted together with a cylinder of soft material superior in magnetic permeability, which is applied over the tooth tips 15A of the toothed member 7A. Then, the circular toothed member 7A is finished by grinding an inside periphery 17 thereof to such extent that there is provided the hollow 28 of the desired inside diameter, but with the bridges 19 remaining to joint together the adjacent teeth 10A. Thus, the stator 6A is completed in which the bridges 19 of the inside cylinder 12 joint together the adjacent teeth 10A, thereby helping ensure the circular toothed member 7A for its shape. Although the bridges 19 remain in the inside cylinder 12A, the existence of the bridges 19 causes no interference because the bridges 19 are much thin and also the stator core composed of the circular toothed member 7A and the cylindrical magnetic path 8A is high in permeability of magnetic flux as well as in magnetic saturation.

A rotor 5 comprises, for example the rotor shaft 2, a magnetically permeable member 31 arranged on the rotor shaft 2, a permanent-magnet member 3 composed of arced permanent-magnet pieces 20A arranged spaced from each other around permeable member 31 in the form of cylindrical configuration and resinous adhesives 21A bonding together any adjacent permanent-magnet pieces 20A, and a reinforcing member 4 of non-magnetic heat-resisting alloy surrounding around the permanent-magnet member 3, the reinforcing member 4 being coated at the inside surface thereof with adhesives. Besides, the resinous adhesives are made of any heat-stable material hard to be fused owing to heat emanated from the windings 13E and 13F.

Figure 15:
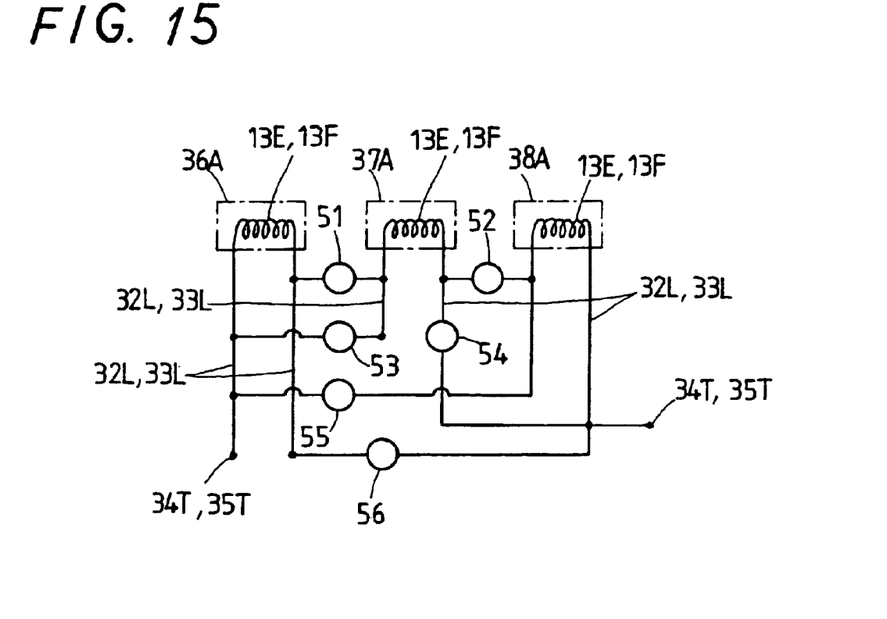
FIG. 15 is a schematic wiring diagram explaining circuit connections of the windings in the generator of FIG. 10.

The windings 13E and 13F are each distributed-wound or concentrated-wound around a field pole corresponding to any pole of the rotor 5. With the generator according to the second embodiment stated earlier, the series connections 36A, 37A and 38A, as shown in FIG. 15, are shunted into parallel connections as the rpm of the rotor 5 increases, thus regulating the generated voltage. At the series connections 36A, 37A and 38A, for example in FIG. 10 the four windings 13E and 13F are connected in series, whereas in FIG. 11 any three windings 13E and 13F are connected in series. Switches 51, 52, 53, 54, 55 and 56 are provided, as shown FIG. 15, in the terminal wires 32L, 33L connected to the windings 13E and 13F. Thus, the generator is constructed so as to regulate the output power as shown in the following Table 2, depending on the ON-OFF operation of the switches 51, 52, 53, 54, 55 and 56.

TABLE 2

| | Switch 51 | Switch 52 | Switch 53 | Switch 54 | Switch 55 | Switch 56 |
| --- | --- | --- | --- | --- | --- | --- |
| Low speed | ON | ON | OFF | OFF | OFF | OFF |
| Medium speed | ON | OFF | OFF | ON | OFF | OFF |
| High speed | OFF | OFF | ON | ON | ON | ON |

Figure 16:
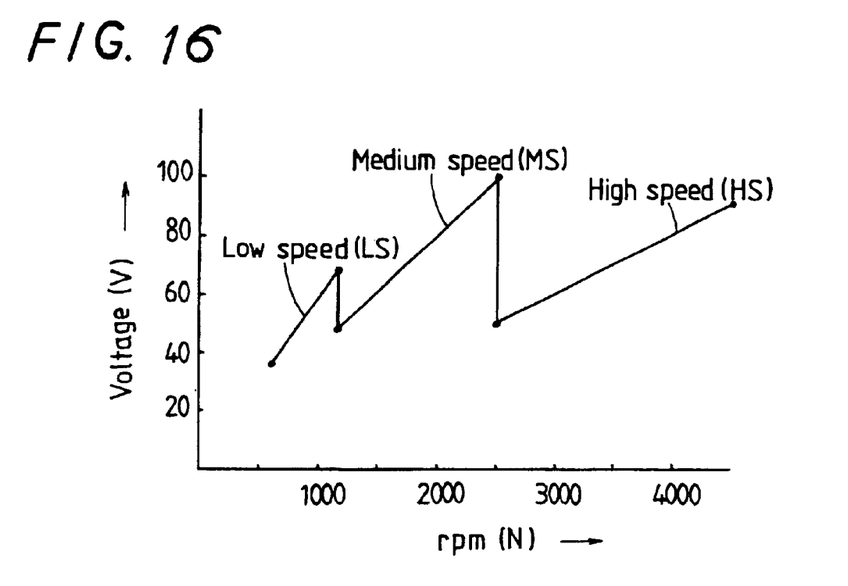
FIG. 16 is a graphic representation showing relations between rpm of a rotor and output voltage occurring in the circuit connections in FIG. 15.

As will be seen from the Table 2, when the engine operates at low speed LS, the controller unit responds to the engine rpm N at the low speed LS to turn on the switches 51 and 52 and turn off the switches 53, 54, 55 and 56, thereby connecting three series connections 36A, 37A and 38A in series to produce the voltage in accordance with the low speed LS, as shown in FIG. 16. When the engine operates at medium speed MS, the controller unit responds to the engine rpm N at the medium speed MS to turn on the switches 51 and 53 and turn off the switches 52, 54, 55 and 56, thereby connecting any two series connections 36A and 37A in series to cut off the residual series connection 38A. This allows producing the voltage V in accordance with the medium speed MS, as shown in FIG. 16. On increase of the engine rpm up to the high speed HS, the controller unit responds to the engine rpm N at the high speed HS to turn on the switches 53, 54, 55 and 56 and turn off the switches 51 and 52, thereby connecting all the three series connections 36A, 37A and 38A in parallel to produce the voltage V in accordance with the high speed MS, as shown in FIG. 16.

The electric power of, for example 12V or 24V produced at the low power windings 13F of the generator serves to energize the most automotive electric equipments, whereas the electric power of, for example 100V induced in the high power windings 13E is used to operate the heaters of diesel particulate filter, heating system and so on, and the auxiliaries such as power-take-off and the like. The production of the high tension of 100 voltage by the high power windings 13E makes it possible to render less the current (I) for the required power (IV), thus making the generator compact or slim in overall construction, thereby reducing the transmission loss in the wiring.

What is claimed is:

1. A generator with plural power-generation characteristics, comprising a rotor shaft supported for rotation in a stator frame, a rotor mounted against rotation on the rotor shaft, and a stator arranged around the rotor and fixed to the stator frame, wherein:

the rotor comprises a permanent-magnet member composed of permanent-magnet pieces arranged spaced from each other around the rotor shaft, resinous adhesives bonding together adjacent permanent-magnet pieces and a permeable member disposed between the rotor shaft and the permanent-magnet member, the stator is comprised of an inside cylinder arranged around the rotor to define an air gap between confronting surfaces of them, teeth arranged in a way spaced circumferentially on the inside cylinder to form sequential slots, an outside cylinder surrounding around tooth tips of the teeth, at least two systems of stator windings either concentrated-wound or distributed-wound with a preselected slot span, one of which is low power windings each containing a small number of turns while another of which is high power windings each containing a large number of turns, and terminal lines having terminals connected to any preselected low power and high power windings, and the stator has a stator core including a circular toothed member and a cylindrical magnetic path, the circular toothed member being composed of the inside cylinder and the teeth that are integral with the inside cylinder and extend radially outwardly to form the slots opened radially outwardly, and the cylindrical magnetic path being prepared separately from the toothed member and fit over the toothed member.

2. A generator constructed as defined in claim 1, wherein the cylindrical magnetic path is closely press-fit over sequential tooth tips of the teeth of the toothed member, together with a cylinder of soft material superior in magnetic permeability.

3. A generator constructed as defined in claim 1, wherein a resinous material is poured on the stator then, followed by solidified to hold in place the stator windings laid in the slots between any two adjacent teeth of the toothed member.

4. A generator constructed as defined in claim 3, wherein the stator windings are led through radially outward slot openings of the slots between the adjacent teeth of the toothed member and wound spanning some slots, while the cylindrical magnetic path fits over the toothed member in which the windings laid in the slots have been held in place with the resinous material.

5. A generator constructed as defined in claim 3, wherein the resinous material is made of any heat-stable material hard to be fused owing to heat emanated from the stator windings.

6. A generator constructed as defined in claim 1, wherein the stator windings concentrated-wound or distributed-wound around a field pole corresponding to any pole of the rotor are shunt from series connections into parallel connections as an rpm of the rotor increases, thus regulating a generated voltage.

7. A generator constructed as defined in claim 1, wherein an electric power produced in the low power windings is supplied to an automotive electric system while an electric power produced in the high power windings is fed to auxiliaries.

8. A generator constructed as defined in claim 1, wherein the number of turns in the winding is varied by on-off operations of switches installed in lines connecting the stator windings with the terminals, thereby regulating the produced electric power.

9. A generator constructed as defined in claim 1, wherein the rotor comprises a reinforcing member of non-magnetic property surrounding around the permanent-magnet member, the reinforcing member being coated at the inside surface thereof with adhesives.

10. A generator constructed as defined in claim 1, wherein the windings are each grouped into at least two winding sets that are divided circumferentially with a slot span on the stator core to be independent of one another, the windings belonging to each winding set being wound displaced in slot circumferentially 120 electrical degrees apart to form a three-phase system of windings, and wherein terminals are distributed uniformly over an inside circumference of the stator such that the windings in a 2nd winding set are arranged in the stator slots so as to overlap with a 1st winding set in waveform of emf, while a 3rd winding set overlaps with the 1st set and the 2nd set in waveform of emf, and a controller unit changing over connections to vary the number of turns in the windings connected in series to the terminals in every winding set, thereby giving electric power at different voltages.

11. A generator constructed as defined in claim 10, wherein the winding are grouped into any of three and four winding sets, which are laid in the slots displaced circumferentially of the inside cylinder.

12. A generator constructed as defined in claim 11, wherein a-c power produced in the windings in the winding sets is rectified at a rectifier circuit, and the resultant rectified power is adjusted by a chopper circuit to a preselected voltage.

13. A generator constructed as defined in claim 10, wherein the winding sets are each constructed in mutually independent electric power source where the produced power may be used either remained a-c form or converted to d-c form.

14. A generator constructed as defined in claim 10, wherein terminals of the windings in the winding sets are selectively connected in series or parallel by the controller unit, whereby a low tension induced in the windings of the winding sets is applied to automotive electric systems, whereas a high tension is applied to either energize the heaters incorporated in diesel particulate filters equipped on automotive vehicles or drive auxiliaries mounted on the vehicles.

15. A generator constructed as defined in claim 10, wherein the windings for high tension are divided into three winding sets, the terminals of the windings are selectively connected either in series or in parallel by the controller unit, and the windings for low tension are wound in a way continued over the whole periphery of the stator to produce the low tension needed to operate the automotive electric system of 24V and so on.

16. A generator constructed as defined in claim 13, wherein the controller unit connects all the winding sets in series to ensure the maximum high tension, connects any of the winding sets in series to ensure any tension less than the maximum high tension and further connects all winding set in parallel to produce the minimum tension.

* * * * *